United States Patent [19]

Lou

[11] Patent Number: 5,769,684

[45] Date of Patent: Jun. 23, 1998

[54] COMPACT LOW-COST PORTABLE SLIDE PRESENTATION TOY

[75] Inventor: Tsz-Ming Lou, Kowloon, Hong Kong

[73] Assignee: Lup Shun Metal & Plastic Ware Factory Limited, Hong Kong, Hong Kong

[21] Appl. No.: 837,093

[22] Filed: Apr. 14, 1997

[51] Int. Cl.[6] .............................. A63H 33/22; G03B 23/10
[52] U.S. Cl. .......................... 446/219; 446/485; 353/110; 40/362; 40/366
[58] Field of Search ................................... 446/219, 485; 353/107, 108, 110, 43; 40/361, 362, 363, 367, 368; D16/225, 227, 228, 233

[56] References Cited

U.S. PATENT DOCUMENTS

| | | | |
|---|---|---|---|
| 2,558,999 | 7/1951 | Aldrich | 353/110 |
| 2,862,319 | 12/1958 | Lipfert | 40/79 |
| 3,002,426 | 10/1961 | McCabe | 353/110 |
| 4,431,282 | 2/1984 | Boeser | 353/108 |
| 4,756,614 | 7/1988 | Kato et al. | 353/43 |

Primary Examiner—Robert A. Hafer
Assistant Examiner—Laura Fossum
Attorney, Agent, or Firm—Burns, Doane, Swecker & Mathis, LLP

[57] ABSTRACT

A low-cost compact slide presentation toy offering combined slide projector and viewer function by integrating a slide projector section and a slide viewer section with a single housing. Both sections share a common slide recieving slot so that simulataneous viewing and projecting is made possible by means of a novel rotatable slide member which carries a plurality of image cells in a diametrically opposite manner. Also, images to be viewed or projected can be changed by simply rotating a slide member without the need of actually removing a slide from the device. This device is particular attractive for young children.

9 Claims, 3 Drawing Sheets

COMPACT LOW-COST PORTABLE SLIDE PRESENTATION TOY

FIELD OF THE INVENTION

The present invention relates to a portable slide presentation toy, and more particularly to a low-complexity compact portable slide presentation toy device having combined slide viewer and slide projector functions in a single device.

BACKGROUND OF THE INVENTION

Slide viewers and projectors are useful visual communication tools for information and knowledge dissemination. These visual tools are particularly valuable in the education of young children since young children are known to be less attracted by textual matters but have strong passions for graphic or pictorial matters, such as images, photos or geometric patterns, especially colour ones.

A slide projector is usually a bulky, heavy and complex desk-top unit having a concentrated light source which enters from one side of a slide and which projects an image on a plain screen on the other side of the slide. For a clear image to be projected, there should be a strong contrast between the projected image and the area surrounding the screen and it is therefore preferable that the screen is enclosed within a dark enclosure, especially when the level of the light source is low.

On the other hand, a slide viewer may a hand-held device in which a slide is placed against a bright background or diffused light source. Both these image forming devices have the potential to be ideal educational toy items. It would therefore be beneficial to children and their parents if a low-cost slide presentation toy which offers combined slide projector and viewer functions were provided. A factor which points in favour of such a combined device is that both use the same type of slide films which carry positive, as contrasted to negative, images and can be viewed or projected by simple optical means without further need of conversion or transformation.

However, it can be seen from above that the operating conditions of a slide projector and a viewer is somewhat conflicting in that one requires an illuminated and the other requires a dark background. Because of the conflicting requirements, it appears that a slide can either be projected or viewed but not both at the same time. This means that a slide has to be transported from a projector slot to a viewer slot or vice versa if the mode of image production is to be changed. Moreover, conventional slide projectors are not quite suitable for children use since they are bulky, heavy, and hot during operation.

According to the present invention, there is therefore provided a slide presentation toy comprising a slide viewer section and a slide projector section wherein said slide viewer section comprises a first slide slot adapted to receive a slide member, a background light source on one side of said slide slot, an elongate chamber on the other side of said first slide slot, wherein said elongate chamber has an opaque enclosure and has first and second ends through which light from said background light source enters from said first end and leaves at the said second end, and an eye-piece adjacent to said elongate chamber, said eye-piece being adapted to accommodate a user's eye and keep out stray light from interfering with the light originating from said light source; said slide projector comprises a second slide slot adapted to receive a slide member, a concentrated light source on one side of said slide slot, an elongate chamber on the other side of said second slide slot, wherein said elongate chamber has an opaque enclosure and has first and second ends through which light from said concentrated light source enters from said first and and leaves at the said second end, and said elongate chamber comprises an inverting means for inverting an optical image as it travels through said chamber from said first end to said second end; and said first and second slide slots are communicable with each other and have a common slot plane which is adapted to receive a slide member on which a plurality of image cells are distributed.

Preferably, said slide member comprises a mounting frame on which a plurality of aperture pairs are distributed in a diametrically opposite manner.

Preferably, said slide member comprises a slide substrate on which a plurality of image cells are distributed in a diametrically opposite manner.

BRIEF DESCRIPTION OF DRAWINGS

The present invention will now be described and explained by way of example of a preferred embodiment and with reference to the accompanying drawings, in which.

DETAILED DESCRIPTION OF THE PREFERRED EMBODIMENT

Figure 1:
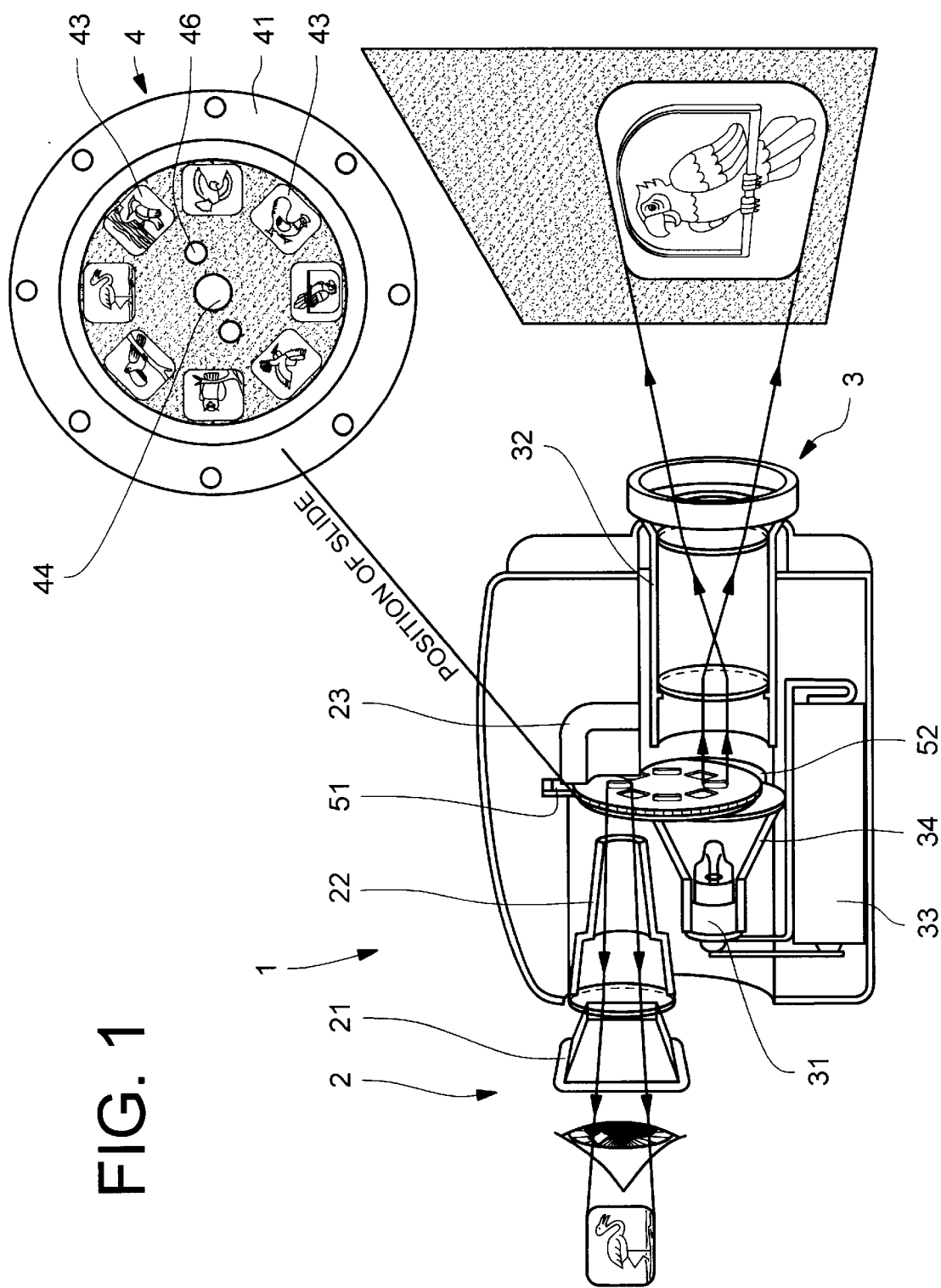
FIG. 1 is a schematic diagram showing the construction of a slide toy according to one embodiment of the present invention.
Figure 2:
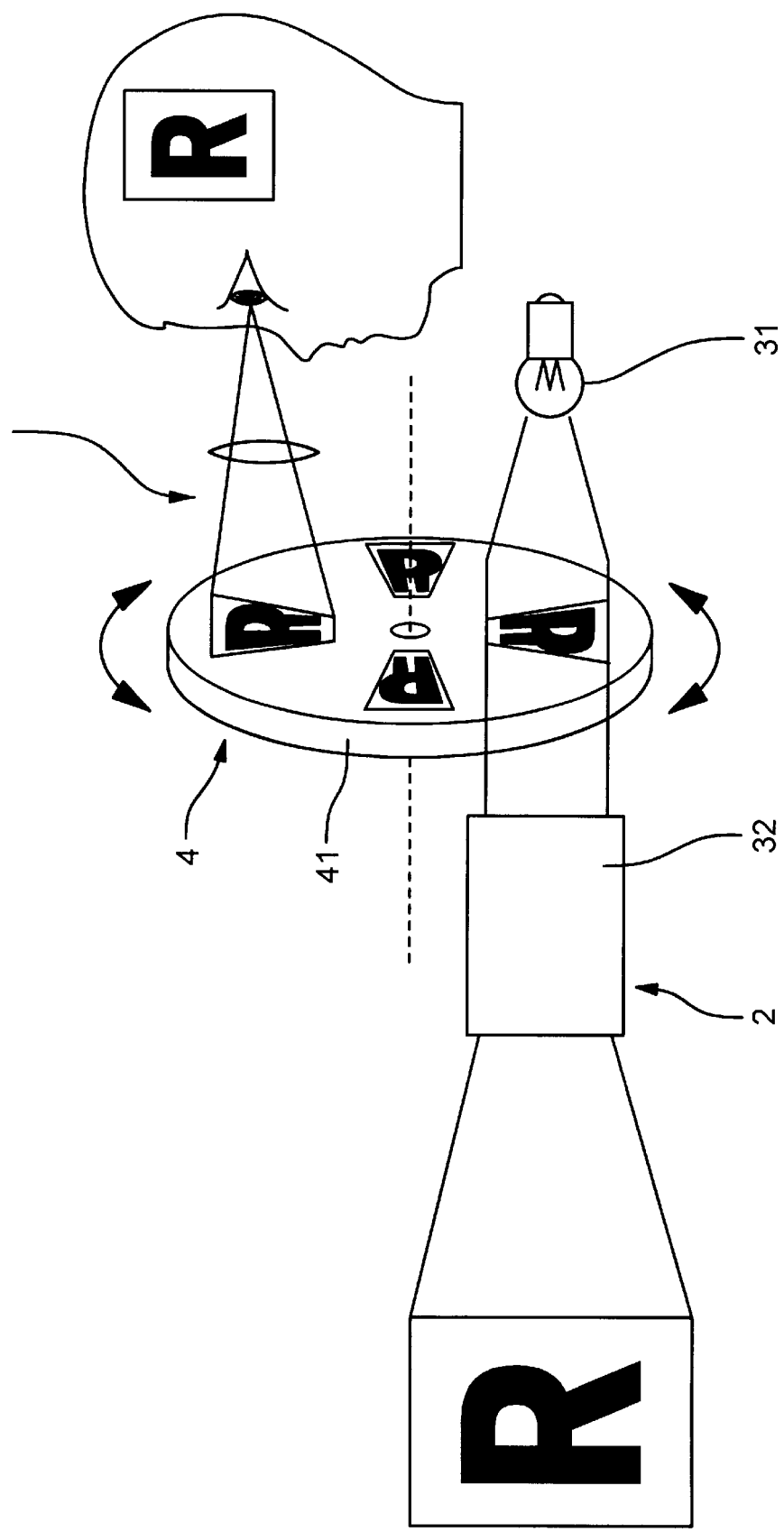
FIG. 2 is a schematic diagram showing operation of the device of FIG. 1.
Figure 3:
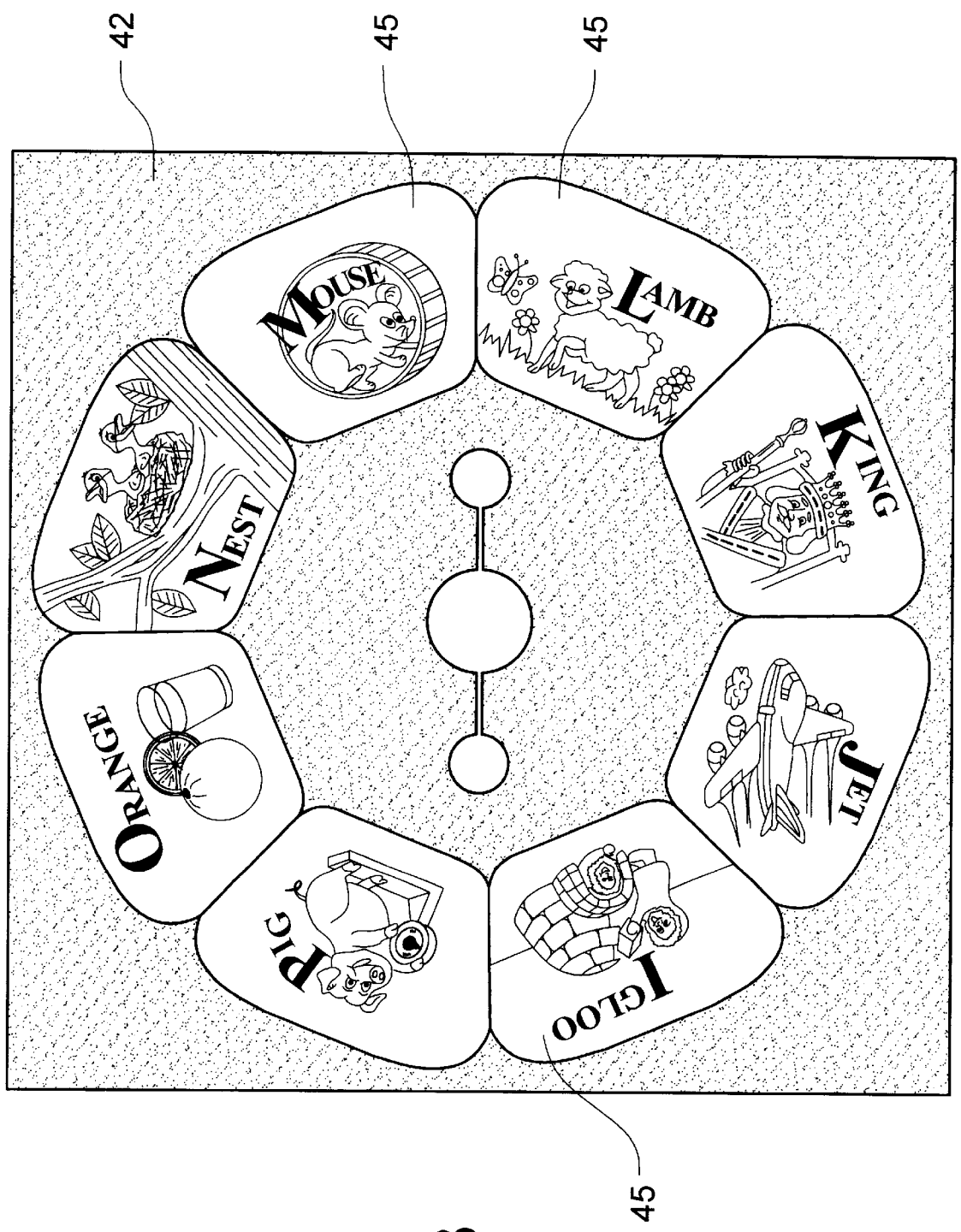
FIG. 3 is a diagram showing the arrangements of pictures on an example slide for use with the device of FIG. 1.

The combined slide projector and viewer toy device 1 shown in FIG. 1 comprises a rigid plastic housing 10 in which a slide viewer section 2, a slide projector section 3 and a slide receiving section 4 are provided. The housing 10 is preferably made of a light and strong plastic such as polyvinyl chloride or other plastics suitable for toys and can be made in a variety of colours to attract children.

The slide viewer section 2 comprises an eye-piece 21, an elongate chamber 22, a slide receiving slot 51 and a background light source. The eye-piece 21 is provided to accommodate a user's eye and to keep away stray light sources. It may also contain a focussing or magnifying lens to improve image viewing.

The elongate chamber 22 maintains a distance between the slide slot and the eye-piece so that the image on a slide may be processed, for example, inverted, enlarged or transformed before reaching the eye. The chamber 22 resembles a tunnel which allows light to enter from one end and leave at the other. The length of the chamber 22 is preferably surrounded by an opaque or translucent material so that the quality of image is not corrupted during transit through the tunnel. In the present embodiment, both ends are linearly aligned so that light enters from the entry end adjacent to the slide receiving slot leaves unaltered at the exit end adjacent to the eye-piece.

At the light entry end of the chamber there is provided a slide receiving slot 51 which is adapted to receive a slide for the present device. Under normal operating circumstances, a slide which is placed inside this slot is visible when viewed through the eye-piece. On the side of the slide slot which is away from the eye-piece there is provided a light source or bright background which is intended to provide the necessary luminous level in order to enable the eye to see the image printed on the slide which is received inside the receiving slot 51.

In the present embodiment, natural instead of artificial light source is used and this is realised by means of a translucent back cover 23 or roof which is attached to the main housing and which permits light from outside the housing to penetrate into the slide receiving slot 51 and to provide a bright background light source. The translucent cover 23 acts both as a light diffuser and a filter so that undesirable exterior images are kept out, leaving only a soft, diffused and relatively plain background illumination. Naturally, instead of natural light source, other light source may be used and it may well be possible to channel the light from the projector section to reduce the need for a number of light sources.

The slide projector section 3 comprise a light source 31, an elongate image chamber 32 and a slide receiving slot 52. The light source 31 for this section comprises a small sized battery 33 powered incandescent light bulb 31 and a light reflector 34 surrounding the light bulb which acts as a light concentrator to increase light intensity originating from a small source. Concentrated light from the light source imparts on the slide slot and leaves after encountering the slide. The image chamber is provided for a purpose similar to that of the viewing chamber in the slide viewer section. For reasons to be discussed below, a set of inverting and enlarging lenses is arranged along the length of the chamber so that the projected image is an inverted version of that on the slide.

The slide slots in both sections are provided mainly for the purposes of receiving and supporting a slide which is mounted on a strengthening frame since ordinary slides are usually soft and thin plastic films. This slide slot is formed as an elongate indentation extending from the outside of the housing towards its inside so that a slide can be inserted into the slot directly from the outside. Furthermore, the slide slots are adapted to receive a slide in such a manner that, after a slide is inserted, a position means formed on the housing will maintain the image bearing slide in a position along and substantially normal to the optical path suitable for image viewing or projecting.

A unique feature of this present invention is that the slide slots for both viewer and projector sections are communicable with each other so that a slide is transportable from one section to another for alternate viewing and projecting without requiring it to be removed from the housing first and then to be re-inserted. In the present embodiment, the communicable slots form a single combined elongate slot having a slot plane which intercepts both optical paths in a substantially normal manner and at the same longitudinal position along the length of the housing. In other words, the slide slots 51, 52 together form a common slot plane which is adapted to receive a planar slide member so that an image form on one part of the slide member can be transported to either of the slide slots.

To fully utilise this combined slide slot so that a slide could be viewed and projected alternately with ease, a preferred slide member design which is suitable for use with the present slide device is now described. Referring to the FIGS., the slide member 4 comprises a rigid mounting frame 41 on which is there is mounted a thin slide film substrate 42. The mounting frame 41 is substantially circular and has a plurality of similarly sized aperture pairs arranged in a diametrically opposite manner about the centre of the mounting frame so that each such aperture is approximately at an equal distance from the frame centre.

The mounting frame 41 is preferably made of an opaque material so that apertures which correspond to a collection of cells 43 on the frame have very clearly defined boundaries between them. To provide a pivot centre for the mounting frame so that it can rotate about a defined centre, there is provided at approximately the frame centre an axle member 44 which extends out of the plane of the frame. This axle member 44 serves an additional purpose as a positioning means for maintaining the frame in a pre-determined orientation with respect to the light paths within the slot.

The slide film substrate 42 carries a plurality of image cells 45 which are arranged in a way similar to the distribution of cells 43 on the frame, that is, in a diametrically opposite manner around a circle about the slide centre so that each image cell is approximately at a same distance from the centre. The images are radially aligned so that the bottom side of the image is towards the slide centre and the top side is away from it. When the slide substrate and the frame are concentrically aligned and a cell aperture aligned with an image cell, the rest of the image cells will be corresponding aligned with the apertures.

A slide member 4 is usually formed firstly by printing or forming a plurality of diametrically disposed image cell pairs on the substrate 42, the image bearing substrate thus formed is then mounted on to the mounting frame 41. Additional off-centre retaining means 46 may be provided on the mounting frame to prevent shifting of the image cells 45 with respect to the mounting frame 41.

If proper images are to be formed, the orientation, position and level of the slide member with respect to the optical paths in both sections should be maintained in a pre-determined manner which will give a calculated image quality, this is assisted in the present invention by providing positioning means on the housing. To meet these requirements, it is preferable that when the slide member is held by the positioning means, the plane of the slide member is substantially normal to the main optical paths of both the slide projector and viewer sections and the main paths are disposed in a diametrically opposed manner about the slide centre so that when an image cell intercepts a first main optical path, the diametrically opposed image cell will then automatically intercept the second main optical path.

A preferred positioning means suitable for the present embodiment is an elongate trough (not shown) which is complementary to the axle member 44 on the slide member 4 and which is formed in the slide receiving slot. The trough is approximately midway along a line joining the main optical paths of the viewer and projector sections. The trough is substantially parallel to the main optical paths so that when the slide axle is placed along and inside the trough, the above criteria are met. Main optical path in the present context means the average light path originating from the light source which is actually required to generate image corresponding to the contents of a slide cell.

To further make slide member positioning easier, the slide slot floor is elevated to a level at which the centre of the slide member is approximately midway between the main optical paths when the slide member is inserted into the slot 52 and supported by the slot floor.

Since the image cells are arranged radially with the bottom side nearest the slide centre, it will be observed that when one image cell is upright, the opposite one will be upside down. Thus, the image will normally be upright if the image cell is at twelve o'clock position while that at six o'clock position is inverted. To allow simultaneous viewing and projecting of diametrically opposite images in a normal and conventional way, there is provided in the projector section inverting lenses which inverts a six-o'clock image to become up-right for conventional projecting.

For example, when the pelican image in FIG. 1 is being viewed through the viewer section, the parrot image cell at six o'clock position is upside down. When light originating from the light bulb imparts on that cell, the image formed as a result will have been inverted when it finally reaches the screen.

With the inclusion of a plurality of diametrically opposite image pairs on a single rotatable slide member, images on a slide member can be presented by both viewer and projector sections and children now have a choice of many images on a single slide member which can be simultaneously viewed and projected. Furthermore, such a slide system also reduce logistic problems since the number of discrete slide members to be stocked is much less than if each slide only carries a single image.

I claim:

1. A compact slide presentation toy comprising a slide viewer section and a slide projector section wherein:

said slide viewer section comprises
- a first slide slot adapted to receive a slide member,
- a background light source on one side of said slide slot,
- an elongate chamber on the other side of said first slide slot, wherein said elongate chamber has an opaque enclosure and has first and second ends through which light from said background light source enters from said first end and leaves at the said second end, and
- an eye-piece adjacent to said elongate chamber, said eye-piece being adapted to accommodate a user's eye and keep out stray light from interfering with the light originating from said light source;

said slide projector comprises
- a second slide slot adapted to receive a slide member,
- a concentrated light source on one side of said slide slot,
- an elongate chamber on the other side of said second slide slot, wherein said elongate chamber has an opaque enclosure and has first and second ends through which light from said concentrated light source enters from said first end and leaves at the said second end, and
- said elongate chamber comprises an inverting means for inverting an optical image as it travels through said chamber from said first end to said second end; and said first and second slide slots are communicable with each other and have a common slot plane which is adapted to receive a slide member on which a plurality of image cells are distributed.

2. A device according to claim 1 further comprising a slide member wherein:

said slide member comprises a mounting frame on which a plurality of aperture pairs are distributed in a diametrically opposite manner.

3. A device according to claim 1 further comprising a slide member wherein:

said slide member comprises a slide substrate on which a plurality of image cells are distributed in a diametrically opposite manner.

4. A device according to claim 3 wherein when an image cell on a slide member is in an upright position, the image cell on the other diametrical end is up-side down.

5. A device according to claim 3 wherein said image cells are radially aligned with the bottom side of each image cell nearest the centre of the slide member and the top side of each image cell furthest from the centre.

6. A device according to claim 1 further comprising positioning means wherein said positioning means is adapted to maintain a slide member at a pre-determined level, position and orientation in order to effect calculated presentation of a slide member.

7. A device according to claim 6, wherein when a slide member is maintained by said positioning means in a pre-determined manner so that an image cell on a slide member is aligned to be viewed through said slide viewer section, another image will be automatically projected by said slide projector section.

8. A device according to claim 6, wherein when a slide member is maintained by said positioning means in a pre-determined manner so that an image cell on a slide member is aligned to be projected by said slide projector section, another image cell can be viewed through said slide viewer section.

9. A device according to claim 1 further comprising a slide member wherein said slide member comprises an axle member about which the slide member is rotatable.

* * * * *